(12) United States Patent
Fulkerson et al.

(10) Patent No.: US 8,970,208 B2
(45) Date of Patent: Mar. 3, 2015

(54) DISPLACEMENT MEASUREMENT SYSTEM AND METHOD USING MAGNETIC ENCODINGS

(75) Inventors: Kurt D. Fulkerson, Milford, MI (US); Donald C. Arns, Jr., Sonoma, CA (US); Paolo G. Sechi, Woodside, CA (US)

(73) Assignee: SRI International, Menlo Park, CA (US)

( * ) Notice: Subject to any disclaimer, the term of this patent is extended or adjusted under 35 U.S.C. 154(b) by 733 days.

(21) Appl. No.: 13/024,778

(22) Filed: Feb. 10, 2011

(65) Prior Publication Data

US 2011/0193552 A1 Aug. 11, 2011

Related U.S. Application Data

(60) Provisional application No. 61/303,600, filed on Feb. 11, 2010.

(51) Int. Cl.
*G01B 7/30* (2006.01)
*G01P 3/487* (2006.01)
*G01L 3/10* (2006.01)

(52) U.S. Cl.
CPC ............ *G01P 3/487* (2013.01); *G01L 3/104* (2013.01); *G01L 3/109* (2013.01)
USPC ................................... 324/207.25

(58) Field of Classification Search
USPC ................................... 324/207.25
See application file for complete search history.

(56) References Cited

U.S. PATENT DOCUMENTS

| | | | |
|---|---|---|---|
| 3,685,029 A | 8/1972 | Blanchard |
| 4,028,619 A | 6/1977 | Edwards |
| 4,071,818 A | 1/1978 | Krisst |

(Continued)

FOREIGN PATENT DOCUMENTS

| | | |
|---|---|---|
| DE | 4232040 A1 | 4/1993 |
| DE | 19941683 A1 | 3/2001 |

(Continued)

OTHER PUBLICATIONS

International Preliminary Report on Patentability for international patent application No. PCT/US2011/024323 mailed on Aug. 14, 2012, 4 pages.

(Continued)

*Primary Examiner* — Bot Ledynh
(74) *Attorney, Agent, or Firm* — Schmeiser, Olsen + Watts LLP; Michael A. Rodriguez

(57) ABSTRACT

A measurement system includes a rotating member configured to transfer mechanical energy to a point of use. The member has at a surface thereof one or more circumferentially oriented bands of magnetizable material. Each band has a magnetic pattern comprised of a plurality of transitions magnetically recorded in the magnetizable material of that band. A magnetic-field sensor is disposed sufficiently near each band of magnetizable material to sense a magnetic pattern recorded in that band as the member rotates. Each magnetic-field sensor generates signals in response to the magnetic pattern sensed by that magnetic-field sensor. Processing electronics is in communication with each magnetic-field sensor to receive the signals generated by that magnetic-field sensor while the member rotates and to dynamically compute from the signals a measurement associated with a performance of the rotating member.

31 Claims, 12 Drawing Sheets

(56) References Cited

U.S. PATENT DOCUMENTS

| | | | |
|---|---|---|---|
| 4,319,188 A | 3/1982 | Ito et al. |
| 4,531,414 A | 7/1985 | Kraus |
| 4,556,886 A | 12/1985 | Shimizu et al. |
| 4,575,929 A | 3/1986 | Bleeke |
| 4,585,978 A | 4/1986 | Hasselmark et al. |
| 4,587,850 A | 5/1986 | Moser |
| 4,608,654 A | 8/1986 | Schafsteller |
| 4,631,951 A | 12/1986 | Bohm |
| 4,638,250 A | 1/1987 | Shen-Orr et al. |
| 4,638,670 A | 1/1987 | Moser |
| 4,659,605 A | 4/1987 | Malik et al. |
| 4,678,993 A | 7/1987 | Vinnemann et al. |
| 4,716,292 A | 12/1987 | Rieder et al. |
| 4,717,874 A | 1/1988 | Ichikawa et al. |
| 4,737,705 A | 4/1988 | Bitar et al. |
| 4,747,215 A | 5/1988 | Waikas |
| 4,756,229 A | 7/1988 | Drakeley et al. |
| 4,793,241 A | 12/1988 | Mano et al. |
| 4,852,411 A * | 8/1989 | Beihoff ............... 73/862.335 |
| 4,871,582 A | 10/1989 | Miyabayashi |
| 4,879,555 A | 11/1989 | Ichikawa et al. |
| 4,904,937 A | 2/1990 | Takahashi et al. |
| 4,926,121 A | 5/1990 | Guay |
| 4,951,048 A | 8/1990 | Ichikawa et al. |
| 5,074,053 A | 12/1991 | West |
| 5,103,172 A | 4/1992 | Stoll |
| 5,115,239 A | 5/1992 | Ushiyama |
| 5,168,274 A | 12/1992 | Wakamatsu |
| 5,231,352 A | 7/1993 | Huber |
| 5,265,480 A * | 11/1993 | Tsuji et al. ............. 73/862.325 |
| 5,351,555 A | 10/1994 | Garshelis |
| 5,412,317 A | 5/1995 | Kyoizumi |
| 5,438,261 A | 8/1995 | Codina et al. |
| 5,442,865 A | 8/1995 | Wallrafen |
| 5,461,311 A | 10/1995 | Nakazato et al. |
| 5,471,736 A | 12/1995 | Griebeler |
| 5,497,083 A | 3/1996 | Nakazato et al. |
| 5,532,598 A | 7/1996 | Clark, Jr. et al. |
| 5,568,760 A | 10/1996 | Volzer |
| 5,610,514 A | 3/1997 | Ramaker |
| 5,652,510 A | 7/1997 | Kyodo |
| 5,771,141 A | 6/1998 | Ohtsuka et al. |
| 5,793,201 A | 8/1998 | Nelle et al. |
| 5,798,640 A | 8/1998 | Gier et al. |
| 5,811,969 A | 9/1998 | Kyodo |
| 5,815,091 A | 9/1998 | Dames et al. |
| 5,850,141 A * | 12/1998 | Adler ............................. 324/174 |
| 5,886,519 A | 3/1999 | Masreliez et al. |
| 5,891,514 A | 4/1999 | Ataka et al. |
| 5,918,199 A | 6/1999 | Yang et al. |
| 5,955,822 A | 9/1999 | Schutze et al. |
| 5,955,881 A | 9/1999 | White et al. |
| 5,973,620 A | 10/1999 | Holzapfel et al. |
| 6,001,446 A | 12/1999 | Nakada et al. |
| 6,002,250 A | 12/1999 | Masreliez et al. |
| 6,005,395 A | 12/1999 | Chan et al. |
| 6,011,389 A | 1/2000 | Masreliez et al. |
| 6,029,118 A | 2/2000 | Strasser |
| 6,034,624 A | 3/2000 | Goto et al. |
| 6,108,925 A | 8/2000 | Freitag |
| 6,145,214 A | 11/2000 | Shimano et al. |
| 6,147,342 A | 11/2000 | Kucher |
| 6,249,234 B1 | 6/2001 | Ely et al. |
| 6,271,661 B2 | 8/2001 | Andermo et al. |
| 6,297,750 B1 | 10/2001 | Wingate et al. |
| 6,300,758 B1 | 10/2001 | Griffen et al. |
| 6,327,791 B1 | 12/2001 | Norcross et al. |
| 6,335,618 B1 | 1/2002 | Nahum |
| 6,393,963 B1 | 5/2002 | Kadlicko |
| 6,408,740 B1 | 6/2002 | Holt et al. |
| 6,418,396 B2 | 7/2002 | Hagl |
| 6,452,158 B1 | 9/2002 | Whatley et al. |
| 6,484,620 B2 | 11/2002 | Arshad et al. |
| 6,486,665 B1 | 11/2002 | Funk et al. |
| 6,509,773 B2 | 1/2003 | Buchwald et al. |
| 6,543,149 B1 | 4/2003 | Carlisle |
| 6,557,452 B1 | 5/2003 | Morroney et al. |
| 6,573,708 B1 | 6/2003 | Hiramatsu et al. |
| 6,578,283 B2 | 6/2003 | Nishi |
| 6,579,634 B2 | 6/2003 | Saito |
| 6,588,313 B2 | 7/2003 | Brown et al. |
| 6,600,310 B2 | 7/2003 | Nyce et al. |
| 6,603,115 B1 | 8/2003 | Gordon-Ingram |
| 6,658,754 B2 | 12/2003 | Omi |
| 6,670,805 B1 | 12/2003 | Bahr et al. |
| 6,670,806 B2 | 12/2003 | Wendt et al. |
| 6,690,160 B2 | 2/2004 | Gray et al. |
| 6,705,511 B1 | 3/2004 | Dames et al. |
| 6,717,401 B2 * | 4/2004 | Schwabe ............... 324/207.22 |
| 6,764,757 B1 | 7/2004 | Wu et al. |
| 6,813,105 B2 | 11/2004 | Takano |
| 6,815,098 B2 | 11/2004 | Matsunuma et al. |
| 6,846,581 B2 | 1/2005 | Oikawa et al. |
| 6,941,827 B2 | 9/2005 | Krone et al. |
| 6,989,669 B2 | 1/2006 | Low et al. |
| 7,034,527 B2 | 4/2006 | Low et al. |
| 7,051,639 B2 | 5/2006 | Krone et al. |
| 7,116,097 B2 | 10/2006 | Revankar et al. |
| 7,191,943 B2 | 3/2007 | Sewell et al. |
| 7,197,424 B2 | 3/2007 | Kucher |
| 7,259,553 B2 | 8/2007 | Arns, Jr. et al. |
| 7,307,418 B2 | 12/2007 | Low et al. |
| 7,439,733 B2 | 10/2008 | Arns, Jr. et al. |
| 7,737,685 B2 | 6/2010 | Low et al. |
| 7,755,350 B2 | 7/2010 | Arns, Jr. et al. |
| 7,843,191 B2 | 11/2010 | Arns, Jr. et al. |
| 7,999,537 B2 * | 8/2011 | LaCroix ................ 324/207.25 |
| 8,058,864 B2 * | 11/2011 | Scheller et al. ............... 324/200 |
| 2001/0006744 A1 | 7/2001 | Saito |
| 2001/0038281 A1 | 11/2001 | Nyce et al. |
| 2002/0017902 A1 | 2/2002 | Vasiloiu |
| 2002/0030482 A1 | 3/2002 | Iwamoto et al. |
| 2002/0157531 A1 | 10/2002 | Kadlicko |
| 2002/0163330 A1 | 11/2002 | Sekiya |
| 2003/0010197 A1 | 1/2003 | Zilioli |
| 2003/0104250 A1 | 6/2003 | Shimizu |
| 2003/0118867 A1 | 6/2003 | Koda et al. |
| 2003/0131724 A1 | 7/2003 | Neumann |
| 2003/0155910 A1 | 8/2003 | Bartingale et al. |
| 2004/0007125 A1 | 1/2004 | Stobrawe et al. |
| 2007/0000336 A1 | 1/2007 | Berdichevsky et al. |
| 2009/0315544 A1 * | 12/2009 | Takahashi et al. ........ 324/207.25 |
| 2010/0176799 A1 * | 7/2010 | Ausserlechner ........... 324/207.2 |
| 2010/0225309 A1 * | 9/2010 | Takahashi et al. ........ 324/207.25 |
| 2010/0242626 A1 | 9/2010 | Weng |

FOREIGN PATENT DOCUMENTS

| | | |
|---|---|---|
| EP | 0212406 A2 | 4/1987 |
| EP | 1239274 A1 | 9/2002 |
| GB | 2096421 | 4/1981 |
| GB | 2199145 | 6/1988 |
| JP | 56142888 A | 11/1981 |
| JP | 57-085193 A | 5/1982 |
| JP | 58-95202 | 6/1983 |
| JP | S62-225947 A | 10/1987 |
| JP | 1-186726 | 7/1989 |
| JP | 01309922 A | 12/1989 |
| JP | 02-138508 A | 5/1990 |
| JP | 03-015702 A | 1/1991 |
| JP | 03265704 A | 11/1991 |
| JP | H04-155201 A | 5/1992 |
| JP | 05126508 A | 5/1993 |
| JP | H05-172504 | 7/1993 |
| JP | 06-295431 A | 10/1994 |
| JP | 408240132 A | 9/1996 |
| JP | 10-260059 A | 9/1998 |
| JP | 11-336713 A | 12/1999 |
| JP | 2008267868 A | 11/2008 |

(56) References Cited

FOREIGN PATENT DOCUMENTS

JP 2009080058 A * 4/2009
JP 2009092400 4/2009

OTHER PUBLICATIONS

Mitsubishi Heavy Ind Co Ltd, Piston Rod with Excellent Corrosion Resistance—Comprises Steel Treated on its Surface with Iron, Derwent, Acc-No. 1983-08972K, 1 Page , 2007.

Duda et al, Plasma Spray Decomposition of a Hard Magnetic Layer, Derwent, Acc-No. 2000-602835, 3 Pages.
NPL_3_Abstracts.
International Search Report and Written Opinion for international patent application No. PCT/US2011/024323 mailed on Sep. 26, 2011, 8 pages.
Notification of Reason(s) for Refusal in related Japanese patent application No. 2012-552989, mailed on Aug. 12, 2014; 6 pages (including translation).
Supplementary European Search Report in related European patent application No. 11742785.6, mailed on Aug. 13, 2014; 6 pages.

* cited by examiner

DISPLACEMENT MEASUREMENT SYSTEM AND METHOD USING MAGNETIC ENCODINGS

RELATED APPLICATION

This application claims priority to and the benefit of U.S. provisional application No. 61/303,600, filed on Feb. 11, 2010, titled "Magnetic Encoding for Drive Line Sensing," the entirety of which application is incorporated by reference herein.

FIELD OF THE INVENTION

The invention relates generally to displacement measurement systems and methods using magnetic encodings on a rotating member.

BACKGROUND

A large number and variety of applications have found value in measuring static and dynamic torque as applied to a rotating shaft. Common static torque is thought to be a steady-state torque having no acceleration component, whereas dynamic torque includes acceleration. Torque is typically measured with one of two methods: inline and reaction. To measure torque inline, sensors are attached into the line of torque transmission, for example, between a motor and the shaft driven by the motor. For reaction torque measurements, sensors derive a value of torque applied to a driven shaft by measuring the torsion, deformation, or strain on the driven shaft. Today, reaction torque sensors are most commonly strain gauges, where foil-based resistance materials are fastened to the exterior of the shaft and strain is measured as forces are applied to the foil material. These sensors require power, often supplied through rotational transformers and a means to read sensor values, commonly by the use of slip rings.

The rotational transformers, associated electronics, and slip rings can make these reaction torque sensors costly and prone to reliability and maintenance issues. Other reaction torque sensors are precise and have the advantage of non-contact sensing. However, such reaction torque sensors may require the attachment of piezoelectric quartz-based surfaces to the rotating shaft and the use of complex electronics, and can be costly to manufacture. Inductive and magnetic approaches to measuring reaction torque have not yet successfully competed against the strain gauge and SAW (surface acoustic wave) sensors. Other approaches, using accelerometers and larger strain gauges that support motors and other power train components, are also in use. Many of these approaches are complex, physically and/or electromagnetically fragile, require many sensor units, and may be costly to fabricate.

SUMMARY

In one aspect, the invention features a measurement system having a rotating member configured to transfer mechanical energy to a point of use. The member has at a surface thereof one or more circumferentially oriented bands of magnetizable material. Each band has a magnetic pattern comprised of a plurality of transitions magnetically recorded in the magnetizable material of that band. A magnetic-field sensor is disposed sufficiently near each band of magnetizable material to sense a magnetic pattern recorded in that band as the member rotates. Each magnetic-field sensor generates signals in response to the magnetic pattern sensed by that magnetic-field sensor. Processing electronics is in communication with each magnetic-field sensor to receive the signals generated by that magnetic-field sensor while the member rotates and to dynamically compute from the signals a measurement associated with a performance of the rotating member.

In another aspect, the invention features a measurement system with a shaft rotating about an axis. The shaft has at a surface thereof a pair of spatially separated circumferentially oriented bands of magnetizable material. Each band has a magnetic pattern comprised of a plurality of transitions magnetically recorded in the magnetizable material of that band. A magnetic-field sensor is disposed sufficiently near each band of magnetizable material to sense the magnetic pattern recorded in that band as the shaft rotates. Each magnetic-field sensor generates signals in response to the magnetic pattern sensed by that magnetic-field sensor. Processing electronics is in communication with each magnetic-field sensor to receive the signals generated by that magnetic-field sensor while the shaft rotates and to compute therefrom torsion experienced by the shaft.

In yet another aspect, the invention features a measurement system with a shaft rotating about an axis. The shaft has at a surface thereof a circumferentially oriented band of magnetizable material. The band has a magnetic pattern comprised of a plurality of transitions magnetically recorded in the magnetizable material. A magnetic-field sensor is disposed sufficiently near the band of magnetizable material to sense the magnetic pattern as the shaft rotates. The magnetic-field sensor generates signals in response to the magnetic pattern. Processing electronics is in communication with the magnetic-field sensor to receive the generated signals while the shaft rotates and to measure, in response to the signals, vibration occurring in the rotating shaft.

In yet another aspect, the invention features a method for measuring performance of a rotating member. One or more bands of magnetizable material are provided at a surface of a rotatable member. Each of the one or more bands has a magnetic pattern comprised of a plurality of transitions magnetically recorded in the magnetizable material of that band. The member is rotated to transfer mechanical energy to a point of use. The magnetic pattern recorded in each of the one or more bands of magnetizable material is sensed as the member rotates. Signals are generated in response to each sensed magnetic pattern. A measurement associated with the performance of the rotating member is dynamically computed in response to the generated signals.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Measurement systems described herein can be used to derive quantitative measures dynamically, such as torque acting upon the rotating member and vibration occurring in the planes of the rotation. In brief overview, such quantitative measures can be derived by measuring the change in linear or rotational distance between two or more magnetically encoded marks upon the member, or by the change in position as a function of time. These measurement systems can thus offer significant advantages over conventional techniques by not requiring slip rings, precision assembly, or the supply of electrical power to the rotating member for sensor use.

More specifically, twisting or torsion of a rigid member can be derived by encoding two or more magnetic patterns on the member, preferably at opposite ends or sides of the member, measuring the distance between the magnetic patterns, and then monitoring the changes between the two magnetic patterns as the member rotates. These magnetic patterns can be magnetically recorded in magnetic material attached to or integrally formed at a surface of the member. For calibration purposes, measurements are taken of the rotating member with no load or under a known load.

As the member twists under an actual load, changes occur in the 'synchronicity' of signals sensed from the magnetic patterns. This difference in signals between magnetic patterns (e.g., a phase shift between signals from the patterns) reflects the twist of the member and the occurrence of vibration. Algebraically combining this displacement information with knowledge of the shape, dimensions, and material of the member, the temperature, and other parameters, allows one to derive the torque impressed upon the member.

For vibration sensing, signals arising from one or more of the encoded magnetic patterns can sense the rotational speed of the rotating member. If resonant or transitory vibrations are being impressed upon the member, one can compute the frequency and phase information of any repetitive vibrations by applying, for example, an FFT (Fast Fourier Transform) algorithm to the rotational velocity of the member, or by other computational methods.

Any of these derived measures of torque and vibration, and of the fundamental measures of displacement, velocity, and acceleration, can be computed locally or forwarded over wired or wireless means to a remote processing location for computation, analysis, and display.

Figure 1:
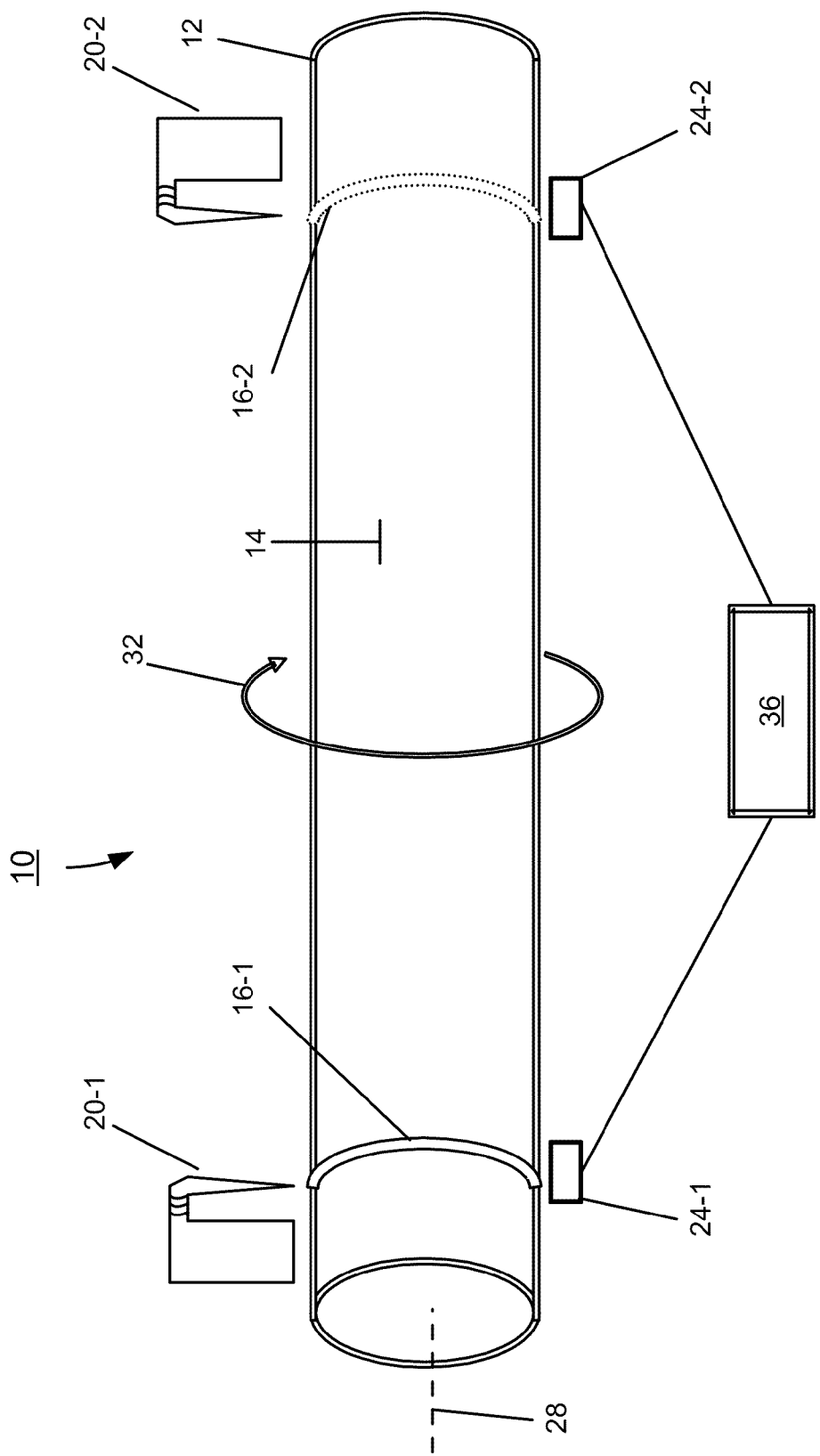
FIG. 1 is a diagram of an embodiment of a measurement system including a cylindrical member having one or more bands of magnetically recordable material.

FIG. 1 shows an embodiment of a measurement system 10 including a cylindrical shaft 12 (herein referred to abstractly as an elongate rotatable member). The member 12 can be solid or hollow, and made of ferromagnetic material (e.g., steel) or non-magnetic material (e.g., plastic, aluminum, ceramic, or glass). In general, the member 12 transfers power from drive source to a point of application. As illustrative examples, the member 12 can be a rod rotated by a motor and coupled at its other end to a machine being driven; or the member 12 can be a shaft rotated by the blades of a wind turbine and coupled to an electricity generator. Although illustrated primarily as applied to an elongate cylindrical member, the principles described herein can also apply to objects of other shapes, for example, a plate.

At the surface 14 of the member 12 are one or more bands 16-1, 16-2 (generally, 16). The band 16-2 appears in FIG. 1 outlined in phantom to signify that some embodiments of the measurement system 10 can require only one band—some parameters, such as vibration, can be measured using only a single band. Derivation of measures for other parameters, such as torque, requires data from both spatially separated bands 16-1, 16-2.

Each band 16 may partially or fully encircle the member 12. In general, each band 16 is a magnetic storage medium, a form of non-volatile memory, made of a magnetizable material for storing magnetically recorded data. The magnetizable material is magnetically "hard", having high coercivity. Magnetizable material of high coercivity requires considerable energy to magnetize (i.e., to record data), but also to demagnetize recorded information.

In one embodiment, thin alloy strips are attached to the member 12 at predefined locations, using adhesives, glues, pastes, cements, epoxy resins, bonding agents or other suitable means, such as hardware fasteners. Preferably, the strips are made of steel that is plated with a Co-based magnetic material. Generally, alloy strips work well with objects (members) made of most materials. Using standard magnetic recording techniques, a magnetic pattern or encoding is recorded in each alloy strip. Preferably, each alloy strip is magnetically recorded before attachment to the member, but may alternatively be magnetically recorded after being attached to the member.

In another embodiment, each band 16 can be formed integrally in a magnetically hard layer at the surface 14 of the member 12. The magnetically hard layer may be continuous, extending continuously between magnetically recorded bands, or be discontinuous between the bands and be only as wide as or slightly wider than the magnetically recorded bands. Techniques for forming a magnetically hard layer on a member, recording a magnetic pattern in the magnetically hard layer, and using the magnetic pattern to measure displacement can be found in U.S. Pat. No. 6,989,669, issued Jan. 24, 2006, and in U.S. Pat. No. 7,259,553, issued Aug. 21, 2007, the entireties of which U.S. patents are incorporated by reference herein. Generally, the magnetic patterns can be magnetically recorded in the magnetically hard layer during the manufacture of the member or in situ, where the member is to be used.

The magnetic recording of the magnetic pattern can be made in one of two standard ways: 1) longitudinal; and 2) perpendicular. In a longitudinal medium, the magnetization lies in the plane of the medium. The magnetic pattern of longitudinal recording consists of "transitions," i.e., head-to-head reversals of the in-plane magnetization from one polarity to the other. In a perpendicular medium, the magnetization is perpendicular to the plane of the medium. For perpendicularly recorded magnetic patterns, the magnetic marking occurs by creating transitions between regions magnetized "up" and "down." The magnetic recordings in each band can be relatively coarse, having one transition occurring every 1 mm. For example, a band of 20 mm in length thus has 20 such transitions. As described in more detail below, embodiments of the measurement system 10 can detect sub-micron displacement between ends of a member based on magnetic patterns having transitions of 1 mm spacing.

In embodiments having two bands, such bands 16 are disposed at a predetermined distance from each other, preferably at opposite ends of the member 12. In general, the greater the distance between the bands 16, the lesser can be the twisting force upon the member 12 in order to produce an angular displacement that is revealed by the bands 16.

Magnetic write heads or encoding devices 20-1, 20-2 (generally 20) magnetically record a magnetic pattern onto each of the bands 16-1, 16-2, respectively. Although two encoding devices 20 are shown, in some instances, one encoding device 20 may suffice to sequentially record magnetic patterns in both bands 16. Additionally, in some applications, the encoding devices 20 do not accompany the member 12 once the member 12 is deployed (i.e., their purpose being to record the magnetic patterns, after which they are no longer used).

Magnetic read sensors 24-1, 24-2 (generally, 24) read the magnetic patterns recorded in the bands 16-1, 16-2, respectively, as the member 12 rotates about an axis 28. These sensors may be, for example, GMR or Hall-effect sensors. Arrow 32 provides an illustrative example of one direction of rotation.

Processing electronics 36 are in communication with the read sensors 24 to collect and process signals produced by the sensors. From these signals, the processing electronics can compute measurements of various parameters, including position, linear and rotational velocity and acceleration, angular displacement, static and dynamic torque, and vibration. Signals read from a single band (e.g., 16-1) are sufficient for the processing electronics 36 to compute some parameters, for example, rotational velocity and acceleration, angular position, and vibration. Readings from multiple bands are used for computing parameters such as torque and, again, vibration.

The processing electronics 36 also provide a system calibration. In embodiments using multiple bands, the system calibration establishes an initial synchronicity (i.e., relationship) between the magnetic patterns of the bands. Preferably, the magnetic patterns recorded in the bands are identical (the same number and sequence of transitions). Notwithstanding, the physical attachment of alloys strips to the member and the physical placement of a magnetic-field sensor near each band are inherently imprecise. Such placement affects the synchronicity of the bands; the system calibration removes the need for precision in the attachment of the alloy strips to the member 12 or in the recording of the magnetic patterns in the magnetically hard layer and in the placement of the sensors 24 near the bands 16.

Figure 2:
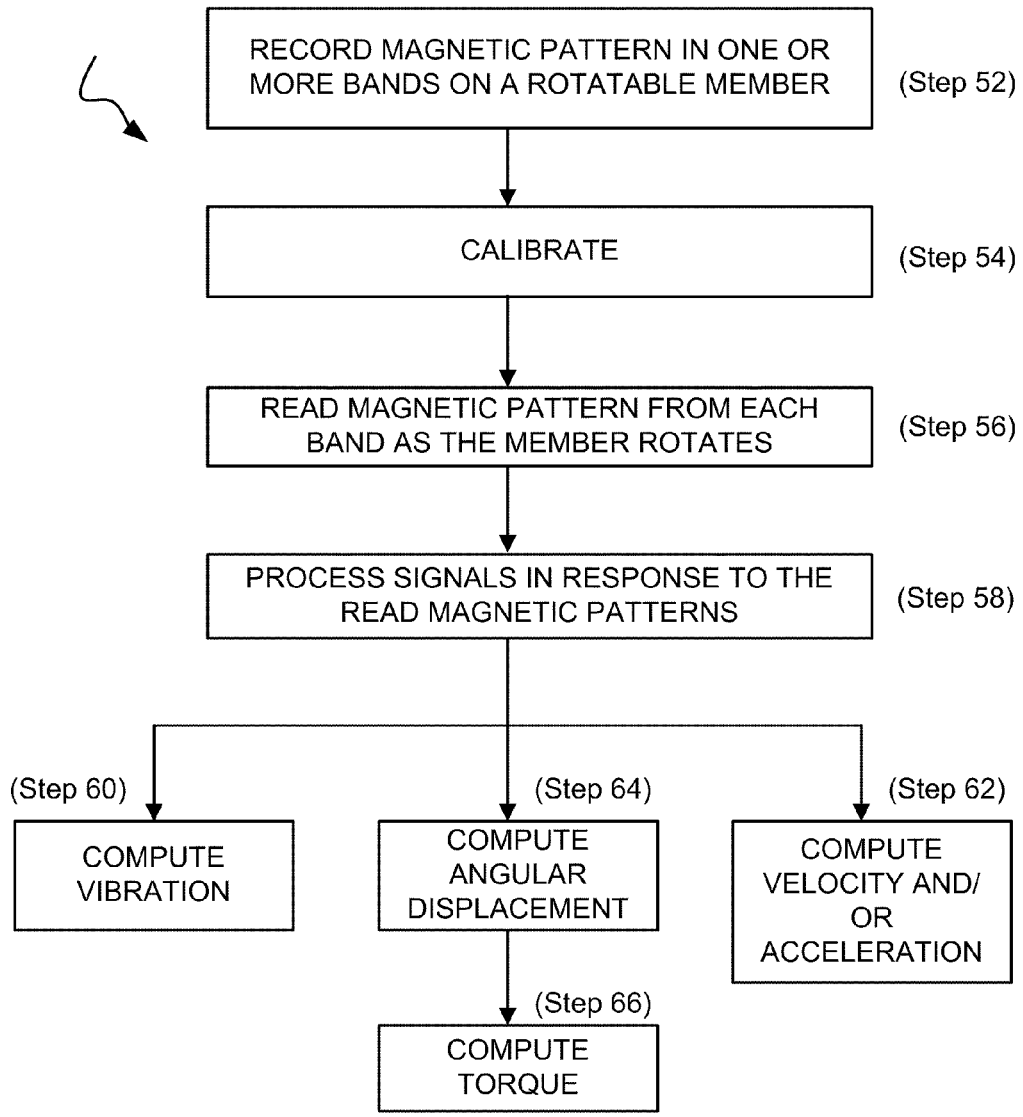
FIG. 2 is flow diagram of an embodiment of a process for measuring various performance parameters of a rotating member based on data read from the one or more bands.

FIG. 2 shows an embodiment of a process 50 for measuring performance of a rotating member. In the description of the process 50, reference is made to the features shown in FIG. 1. At step 52, one or more bands of magnetically recorded magnetic patterns are applied to a rotatable member. A calibration can be performed (step 54) to establish an initial angular displacement (a synchronicity) between the bands, which serves as an offset against subsequent measurements of angular displacement acquired during rotation of the member under load. Such a calibration can be performed at zero torque or at a known torque.

As the member 12 rotates, each magnetic-field sensor reads (step 56) the transitions of the magnetic pattern of the band near which that magnetic-field sensor is disposed. The processing electronics 36 receives and processes (step 58) the signals generated by each magnetic field sensor.

From the processed signals, the processing electronics 36 can derive any one or more of variety of physical parameters associated with the rotation of the member, for example, vibration, torsion, torque, velocity, and acceleration. For example, the processing electronics 36 can compute (step 60) vibration by passing the processed signals through a Fast Fourier Transform algorithm to extract phase and frequency information from the signals. By counting transitions over time, and knowing the spacing between transitions or the number of transitions per revolution, the processing electronics 36 can compute (step 62) velocity and changes in velocity (acceleration and deceleration). The count of transitions can also be used, with a known reference point zero and the diameter of the member, to determine the instantaneous angular position of the member.

From signals received from the two spatially separated magnetic-field sensors, each reading data from one of two spatially separated bands, the processing electronics 36 can compute (step 64) an angular displacement (twisting or torsion) between the bands. From the angular displacement and other physical characteristics of the member, the processing electronics can compute (step 66) the torque impressed upon the member. Such torque measurements are made dynamically while the member rotates.

FIG. 3-FIG. 7 demonstrate the principles of the displacement measurement system 10 using two physically separate magnetically recorded linear tracks recorded lengthwise on a member. The tracks extended along the member for 20 mm. Transitions were spaced 1 mm apart in the tracks (i.e., each track had 20 recorded bits). A GMR (giant magnetoresistive) sensor having two GMR sensing elements (bridges) was used to read the magnetic transitions. Each of the two GMR sensing elements detected a different one of the tracks as the member moved linearly. The two GMR sensing elements had a 0.25 mm separation between them. The observations made with respect to displacement measurements for the linear tracks are directly applicable to displacement measurements for the circumferential tracks because the tracks are independent and spatially separated, the sensor elements are independent and spatially separated, and each sensor element reads the magnetic pattern from a different track.

Figure 3:
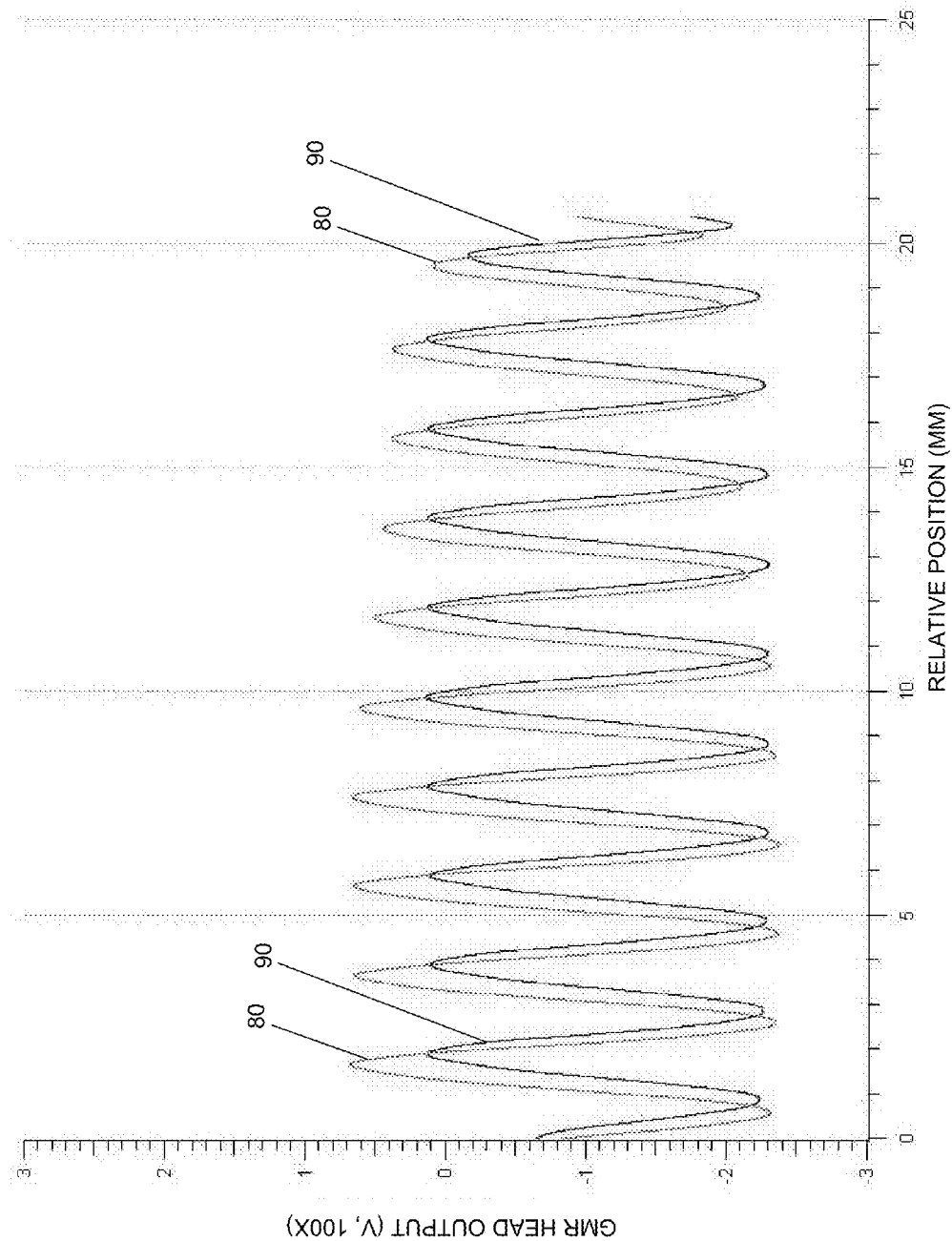
FIG. 3 is a graph of two waveforms produced by GMR sensing elements from magnetic patterns encoded on two separate linear tracks on a member as the member moved linearly.

FIG. 3 shows a graph of the waveforms 80, 90 corresponding to data sensed by the two different GMR sensing elements from the two different linear tracks. The x-axis of the graph corresponds to the relative position of the sensing elements over the tracks. For example, a relative position of 10 mm approximately corresponds to the $10^{th}$ transition in each track (because of the 1 mm spacing of the transitions). The y-axis corresponds to the voltage output detected by the GMR sensing element. The sensed waveforms 80, 90 are sinusoidal, with their peaks and troughs corresponding to locations of greatest signal strength.

Typically, the magnetic recordings in different tracks are not perfectly identical to each other, and can vary because of variations in the thickness or structure of the magnetically layer in which the magnetic patterns of transitions are recorded. The same causes of variation affect the magnetic recordings in the circumferential bands of magnetic patterns. As shown, the waveform 80 decays in amplitude as the sensing progresses along the track, whereas the waveform 90 remains stable along the recorded track. Here, the waveforms 80, 90 differ in amplitude (coming from physically separate recordings). The sensors 80, 90 also have different overall DC offsets and variations in DC offsets.

Further, in order to measure torque on a rotating member, a calculated resolution greater than 1 mm is needed because the torsional twist of the member is typically measured in microns rather than in millimeters. An important factor for making high-resolution measurement relies on exploiting the continuous rotation of the member to collect many data points from the coarsely encoded magnetic pattern over a few cycles. Collected from each end of the member, these numerous data points can then be processed to determine the relative displacement (i.e., torsion) accurately and dynamically between the ends of the member.

Figure 4:
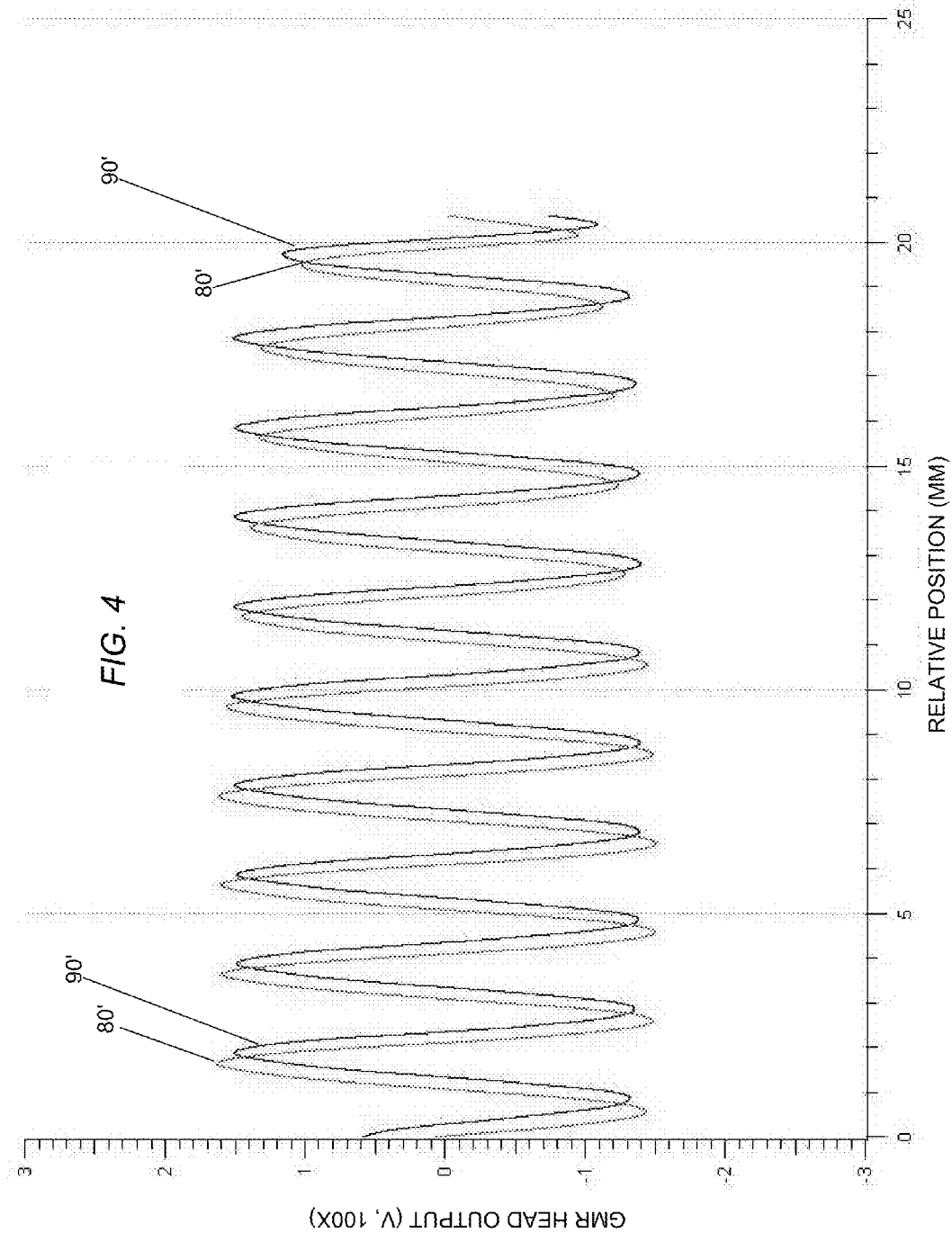
FIG. 4 is a graph of the two waveforms of FIG. 3 after preprocessing.

FIG. 4-FIG. 7 illustrate how micron-level accuracy for displacement measurements can be obtained from the coarse 1 mm transitions that produced the waveforms 80, 90 of FIG. 3. FIG. 4 shows the two waveforms 80', 90' after preprocessing to remove variations between the tracks. To remove the DC offset from each waveform 80', 90', the mathematical average of the data points is subtracted. The data are then scaled to have a root-mean-squared (RMS) amplitude of 1. Such computations can be automated in production, lessening the effects of variations in placement of the magnetic-field sensors and in the strips having the magnetic patterns.

Figure 5:
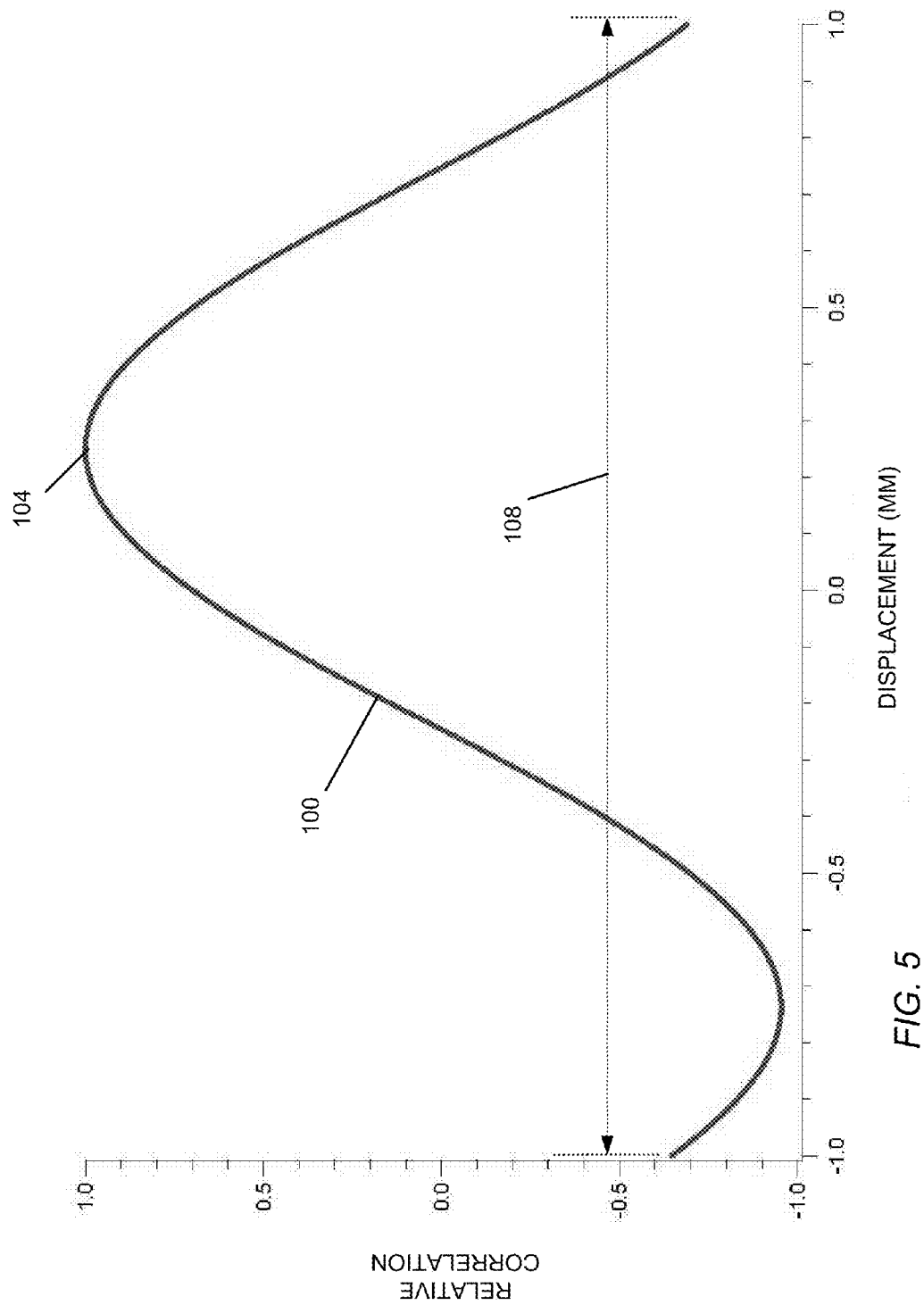
FIG. 5 is a graph of a cross-correlation of the preprocessed waveforms across a region of interest.

FIG. 5 shows a cross-correlation of the waveforms 80', 90' across a region of interest, here, for example, between −1 mm and 1 mm of displacement (x-axis). The cross-correlation (y-axis) is a measure of similarity of the two preprocessed waveforms 80', 90'. The resulting data 100 show a peak correlation (scaled to unity) at a displacement of 0.25 mm, which corresponds to the 0.25 mm separation between the two GMR sensing elements used to independently sense the physically separate tracks.

For a rotating member, the ideal displacement is zero at zero torque. In practice, the displacement at zero torque could be any known value that is subtracted as part of a calibration phase performed on the member before use. The magnetic encoding can be applied with high accuracy (sub-micron), though the placement of the encoded bands and the read sensors at each end of the member may not enjoy similar sub-micron precision. Thus, a calibration initially establishes the relationship between the ends of the members. In the linear torsion range of the member, the slope of the linear torsion/torque relationship is determined by physical parameters of the member (e.g., size, material, construction, etc.), while the y-intercept is the relative displacement of the ends of the member. Calibration data collected at zero torque or at a known torque are used to determine this y-intercept value.

As shown in FIG. 5, the width of the peak 104 of the resulting data 100 is broad, however, and not well suited to micron-level discrimination. For a traditional cross-correlation, such as employed in FIG. 5, the peak width is determined by the underlying data; that is, the coarse 1 mm resolution of the transitions and the wavelength 108 of the correlation is 2 mm. This wavelength 108 corresponds exactly to the wavelength of the magnetic encoding. Because of underlying dependency, increasing the sampling rate or sample size has no effect on the peak width or the ability to discriminate small variations.

A different correlation technique, known as the inverse sum of squares of difference or ISSD, is one method that can provide greater accuracy than the traditional cross-correlation. ISSD is mathematically sound (based on a known technique used for curve fitting), easy for a processor to implement, computationally feasible in real-time (being algebraic), and produces satisfactory results. In effect, the ISSD correlation computes the reciprocal of the sum of the square of the differences between the two waveforms 80', 90' (FIG. 4) by performing a least squares fit of one waveform to a set of varying delay versions of the second waveform. One of the delay version waveforms yields the best fit, indicating the delay, or relative displacement, between the two waveforms 80', 90'. Because the best fit is the smallest output result, inverting the result makes the peak easier to detect.

Equation (1) expresses the ISSD correlation mathematically:

$$ISSD[d] = \frac{1}{\sum_{m=0}^{N-1}(b1[m]-b2[m+d])^2}, \quad \text{Eq. (1)}$$

where ISSD is the correlation result, b1 and b2 are the two preprocessed GMR sensor waveforms, N is the number of data points, and d is the delay, an integer index allowed to be positive or negative.

Figure 6:
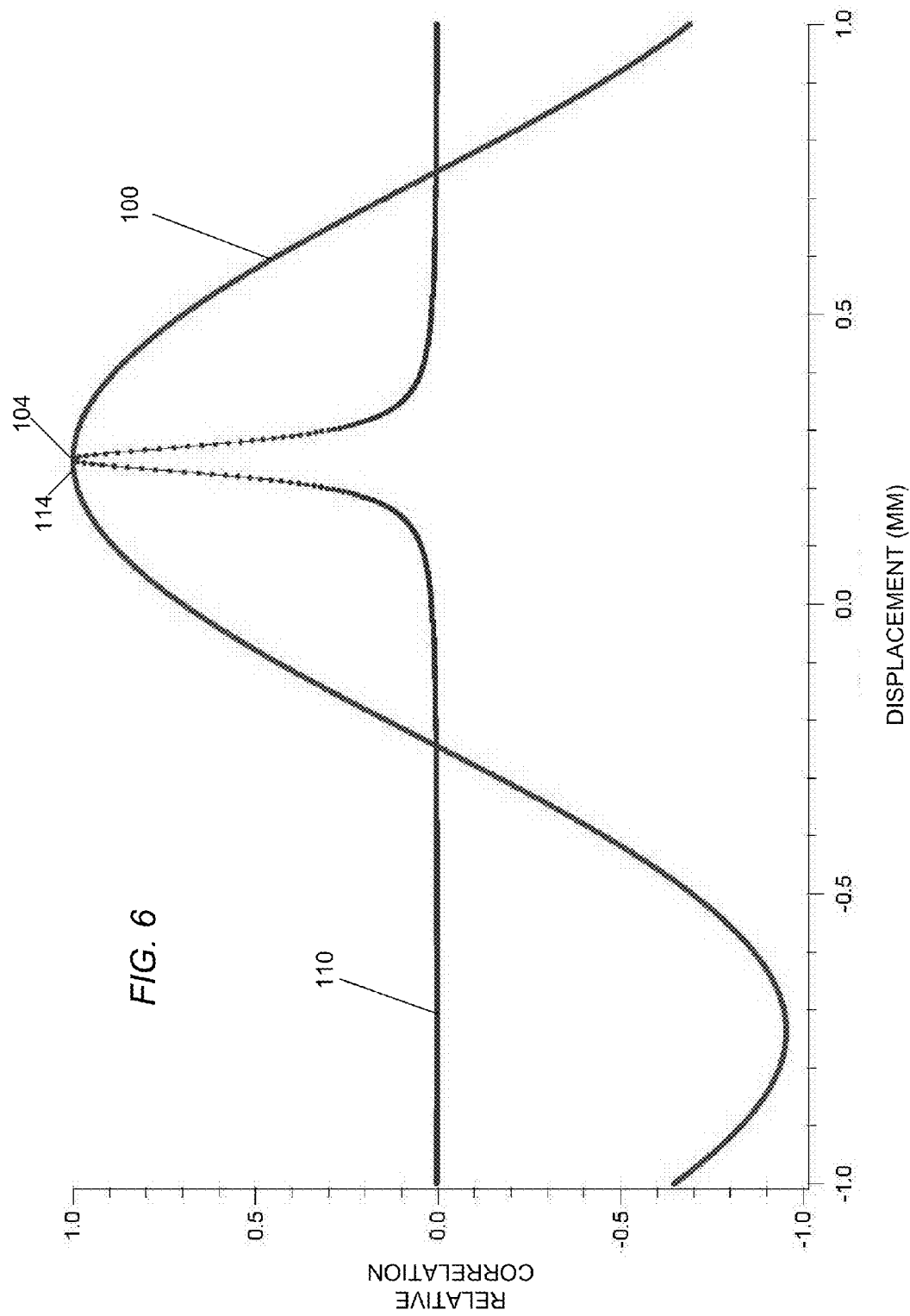
FIG. 6 is a graph of an inverse sum of the squares of difference correlation of the preprocessed waveforms.
Figure 7:
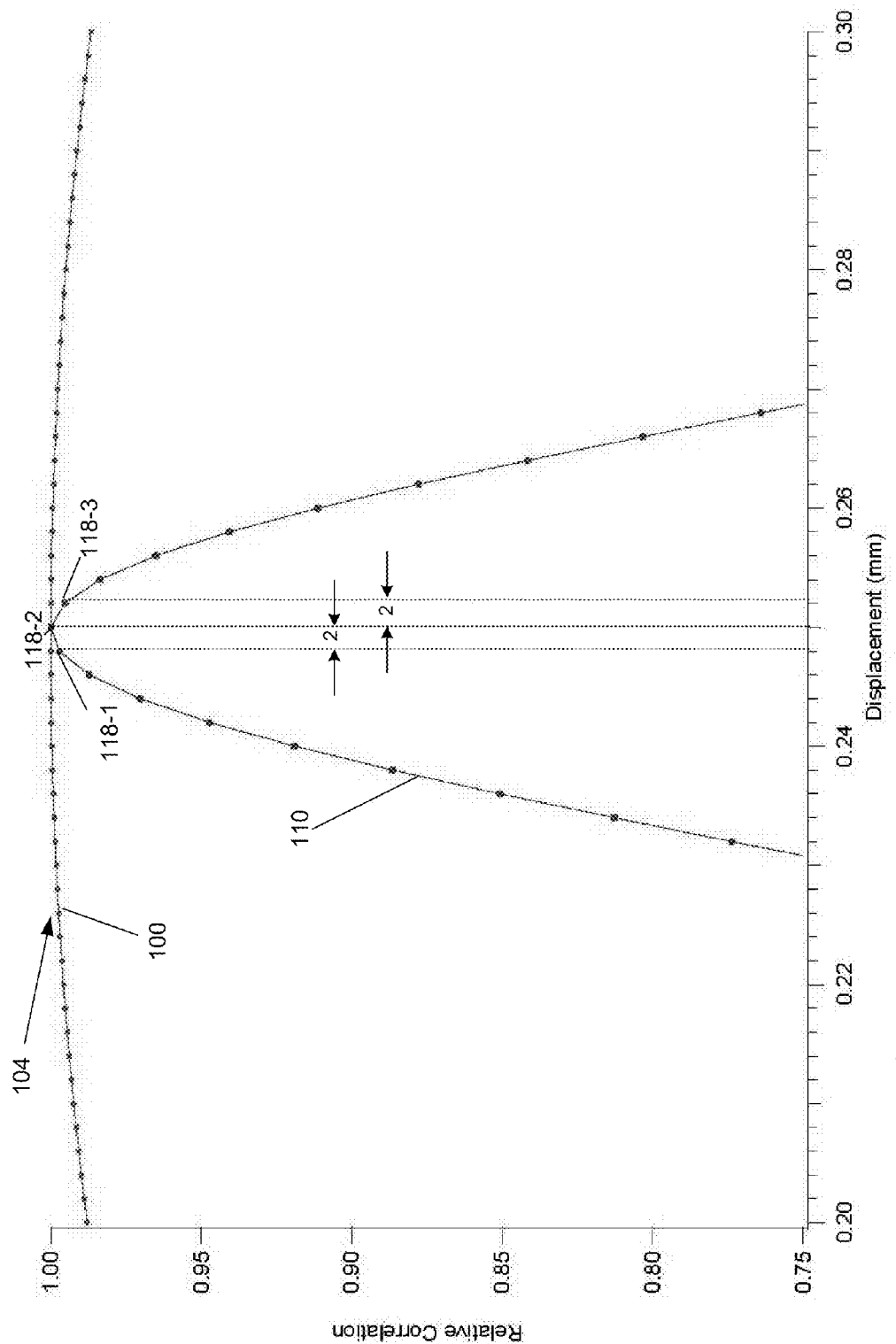
FIG. 7 is a graph providing a magnified view of the peak area of the graph of FIG. 6.

FIG. 6 shows the result 110 of this ISSD correlation (scaled to unity). The ISSD peak 114 is much more sharply defined than the peak 104 of correlated data 100 in FIG. 5. FIG. 7 shows a magnified view of the peak area of the traditional correlation 100 and the ISSD correlation 110, where the individual data points about the peak can be seen. The original sensor data contains approximately 10,000 data samples with a data point every 2 μm. Even if some ambiguity exists about which data point is actually the peak point, one of the top three data points 118-1, 118-2, 118-3 in FIG. 7 is certainly the peak point, yielding an ambiguity of ±2 μm. Thus, the ISSD correlation produces a ±2 μm resolution from the 1 mm transitions in the magnetic pattern.

Applying, for example, this 20-mm long magnetic pattern with 1 mm transition spacing circumferentially about a 2″ diameter rod, the recording extends about ⅛th of the way around the rod. Accordingly, applying eight such 20-mm magnetic patterns, end-to-end, completely encircle the rod. Thus, eight torque measurements of this accuracy (±2 μm) derived from eight 20-mm long magnetic patterns with 1 mm transition spacing can be obtained for each complete revolution of the rod. Consider, for example, that the rod makes one revolution per minute; this produces 8 torque measurements per minute or one torque measurement every 7.5 seconds (7.5 Hz).

In one embodiment, after a torque measurement is computed from a data recording (e.g., 20-mm), the collected data are discarded. In other embodiments, the collected data can be saved for subsequent use, for example, in the event a torque measurement update could not be produced fast enough. In general, the frequency of torque measurement updates can depend upon such factors as the speed of rotation of the rod, the diameter of the rod, the length of the data recording (e.g., 20 mm), and the number of transitions in the data recording. A maximum torque measurement update rate can be expressed mathematically by equation 2:

$$w = \frac{\pi dr}{60Ns} \quad \text{Eq. (2)}$$

where w=maximum torque measurement rate (in Hz); d=the diameter of the shaft (in mm); r=RPM (shaft revolutions per minute); N=the number of magnetic transitions to process in order to achieve a desired resolution; and s=magnetic transition spacing (in mm).

For example, the maximum update rate (w) for a 2-inch (50.8 mm) diameter shaft rotating at 1 RPM, having 20 magnetic transitions spaced apart by 1 mm is equal to 0.133 Hz, or one torque reading every 7.5 seconds. It is to be understood that Equation 2 defines a maximum update rate, and that torque measurements can be made less often than the maximum.

The accuracy of the results of the ISSD correlation improves when more data is processed, either by increasing the sample rate or the sample size. As an example, examining 140 mm of data (sample size) collected at a higher sample rate yields approximately 280,000 data samples and a data point every 0.5 µm. Applied to a rotating member, the data collection is comparable to sampling four times faster than the sampling rate of the data previously described, over an entire revolution of a 2" diameter rod (rather than over just ⅛th of a revolution).

Figure 8:
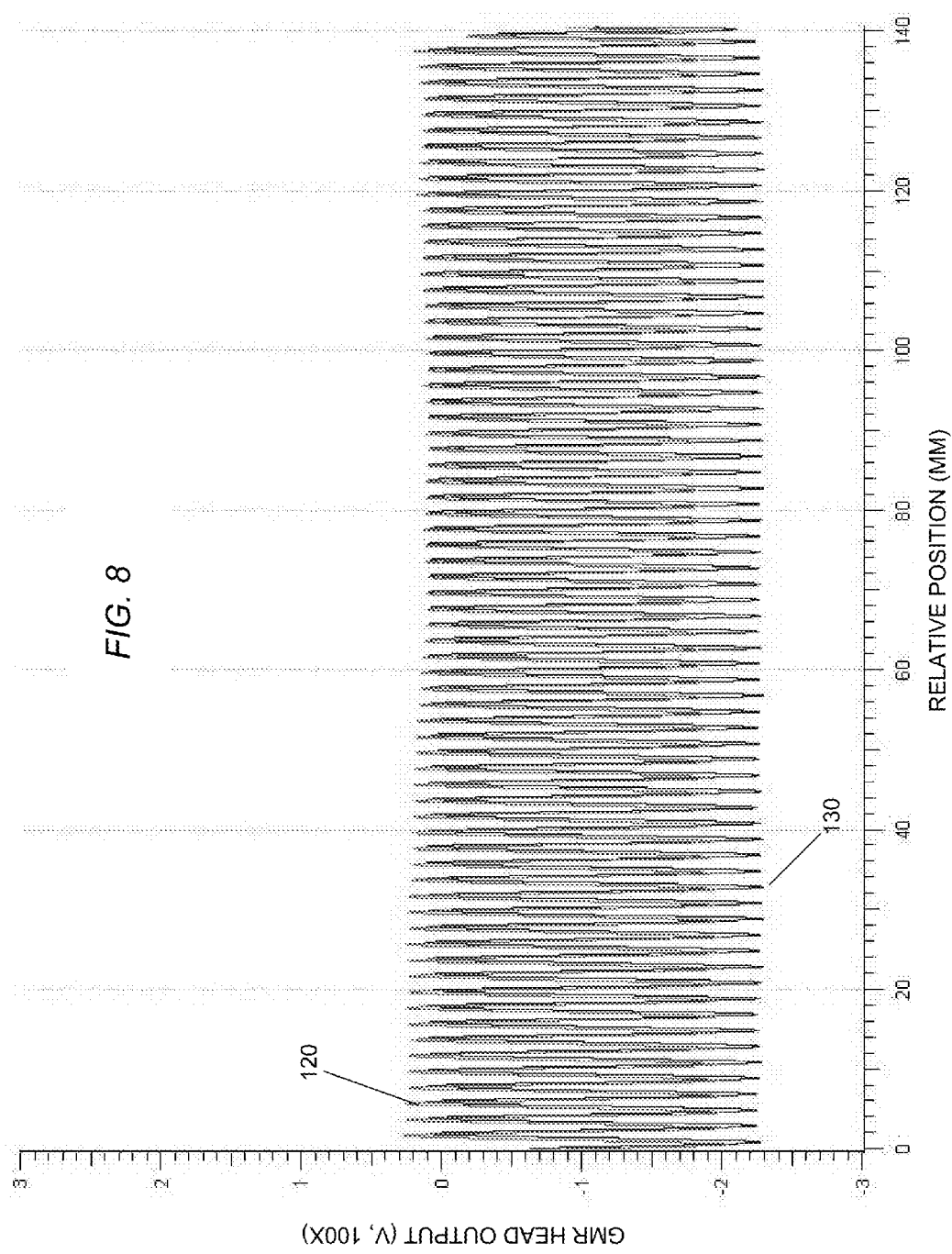
FIG. 8 is a graph of two waveforms read by two sensors using increased sample size and increased sample rates in comparison to the waveforms of FIG. 3.
Figure 9:
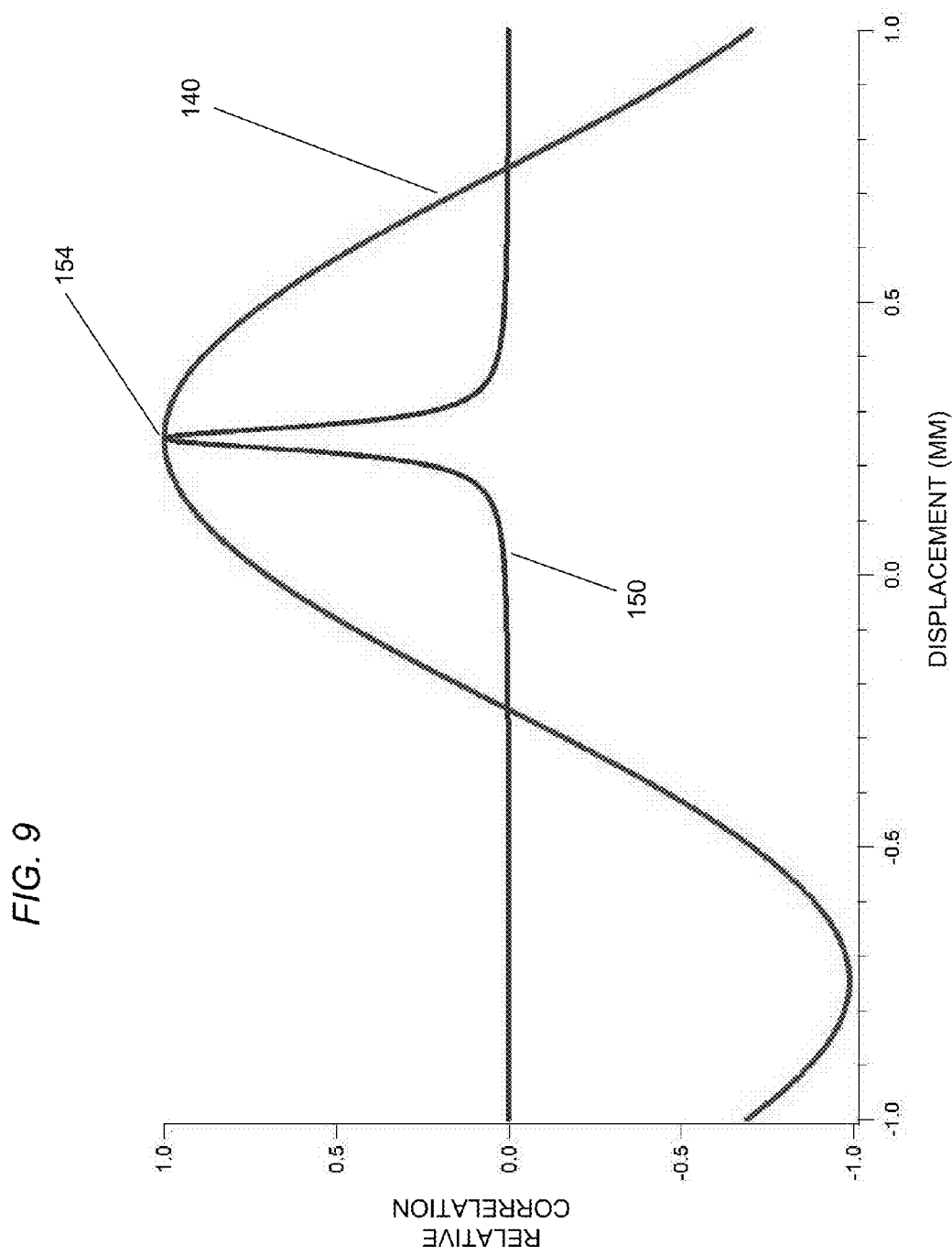
FIG. 9 is a graph showing the results of a traditional cross-correlation and an ISSD correlation of the two waveforms of FIG. 8.

FIG. 8 shows two waveforms 120, 130 produced by two sensors reading a 140-mm magnetic pattern with coarse 1 mm magnetic transitions, thereby collecting 280,000 data points over one revolution of a 2" diameter rod. FIG. 9 shows the results of a traditional cross-correlation 140 and the results of an ISSD correlation 150 for the two waveforms 120, 130 of FIG. 8. The ISSD correlation 150 is well behaved in the region of interest and the peak 154 is slightly narrower than that of the cross-correlation 140.

Figure 10:
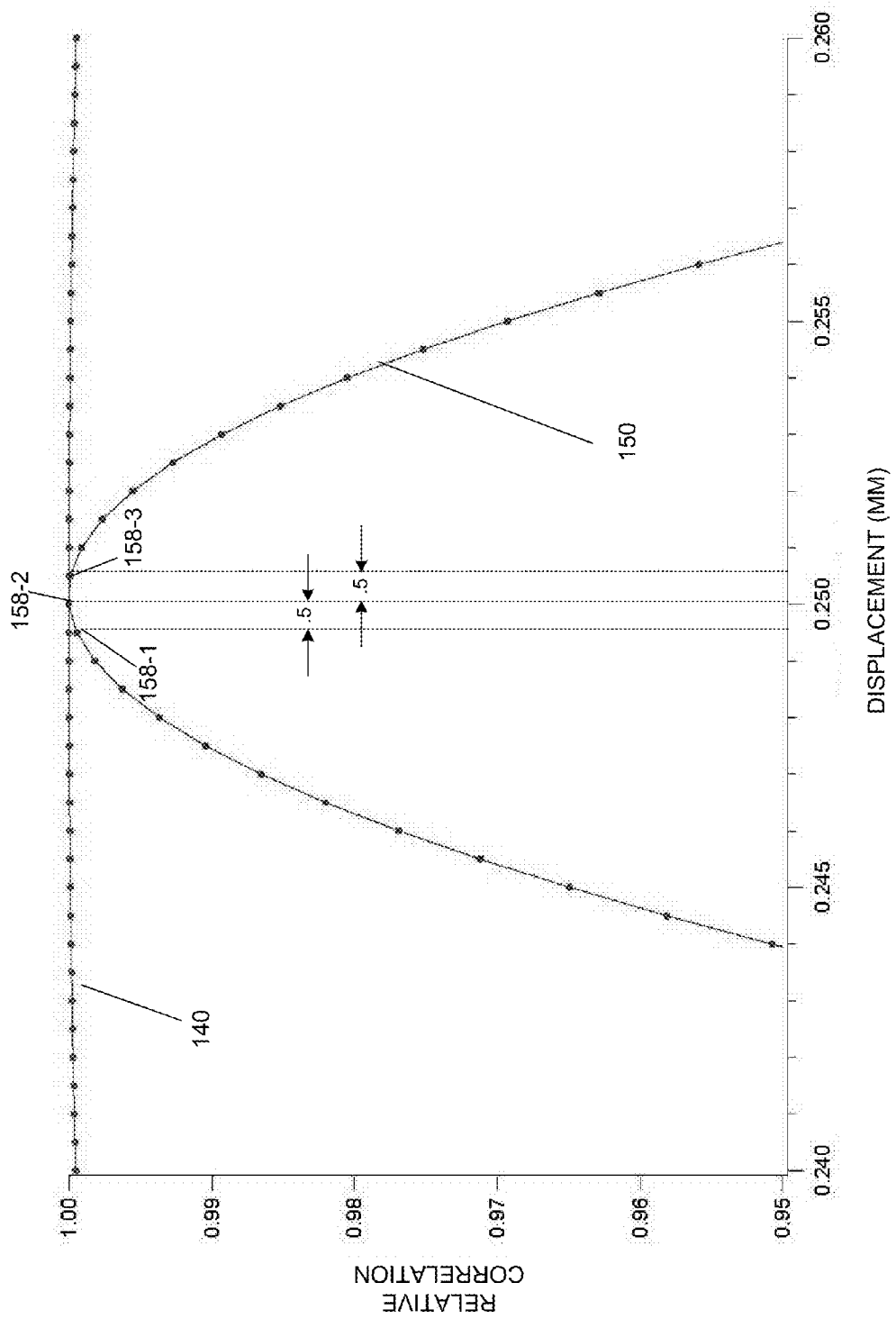
FIG. 10 is a graph showing a magnified view of the peak area of the graph of FIG. 9.

FIG. 10 shows a highly magnified area representing two hundredths of a millimeter on the x-axis (considerably more magnified than the data in FIG. 7). The peak 154 in the ISSD correlation 150 is clearly distinguishable as before, except that here the uncertainty of a data point in each direction amounts to ±0.5 µm (as illustrated by data points 158-1, 158-2, 158-3). Hence, collecting 280,000 data points over one revolution of a 2" diameter rod with coarse 1 mm magnetic transitions yields sub-micron resolution for determining relative angular displacement.

Consider, for example, subjecting a 1 meter long, hollow steel rod, having a 50 mm diameter with a 2 mm thick wall, to 100 Nm of torque. The angular displacement of this rod will be 0.364°, or 159 µm, on the surface of the rod. This amount of angular displacement falls within the resolution capabilities of the measurement system described in connection with FIG. 7. If the torque on this rod increases from 100 Nm to 101 Nm, the additional deflection (angular displacement) is 0.00364°, or 1.59 µm. This additional angular displacement is slightly less than the resolution (2 µm, FIG. 7) with the short (20 mm) data record, and may go unobserved, whereas the additional angular displacement is within the resolution (0.5 µm, FIG. 10) provided by the longer data record (140 mm), and is detected by the measurement displacement system.

The performance of the angular displacement system may be affected by torsional vibration or oscillation of the member during a measurement interval. If the vibration or oscillation is of low enough frequency, the vibration or oscillation is observed as variations in the speed of rotation of the member, and thus as varying torque, across torque measurement updates (e.g., eight times per revolution according to the example of FIG. 3 to FIG. 7). If the vibration or oscillation is of higher frequency, such vibration or oscillation falls into the data collection window of each torque measurement and has the effect of varying the observed spatial frequency.

Figure 11:
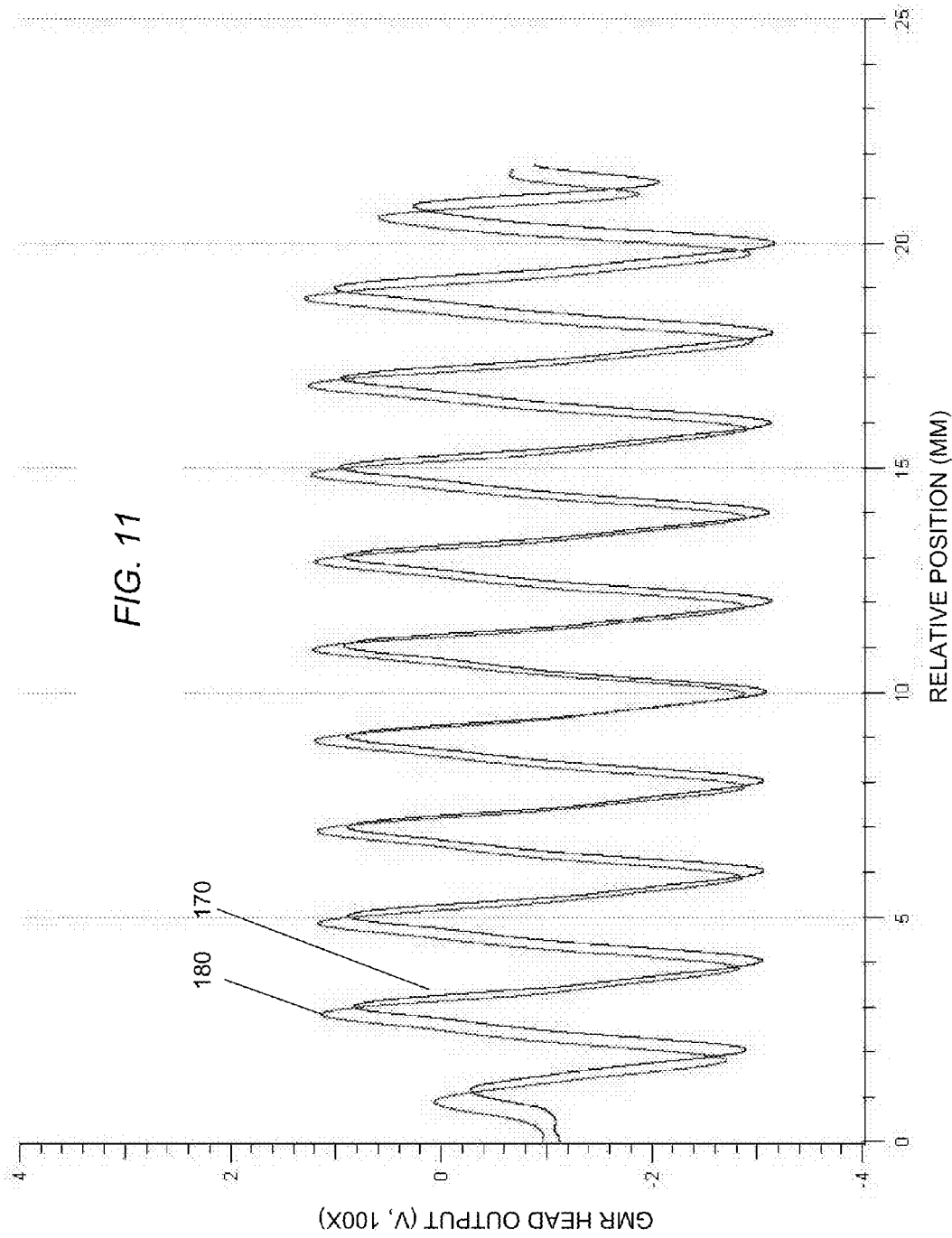
FIG. 11 is a graph showing an example of varying displacement between two waveforms acquired from spatially separated bands.

FIG. 11 illustrates an example of the influence of a vibration on torque measurement. Two GMR sensing elements read a 20 mm long data recording (⅛th of a revolution). One end of the member (e.g., the shaft end near the motor) maintains a constant rotation, while the other end experiences vibration. The GMR sensing element reading the end of the member that maintains the constant rotation produces waveform 170; the other GMR sensing element sensing the vibration produces waveform 180. During the span of data collection, the displacement between the waveforms 170, 180 varies from maximum displacement (0.25 mm at 1 mm relative position) to near zero displacement (at approximately 10 mm relative position), returning to maximum displacement at the end of the data recording. This example illustrates a severe case of vibration's affect on displacement.

Figure 12:
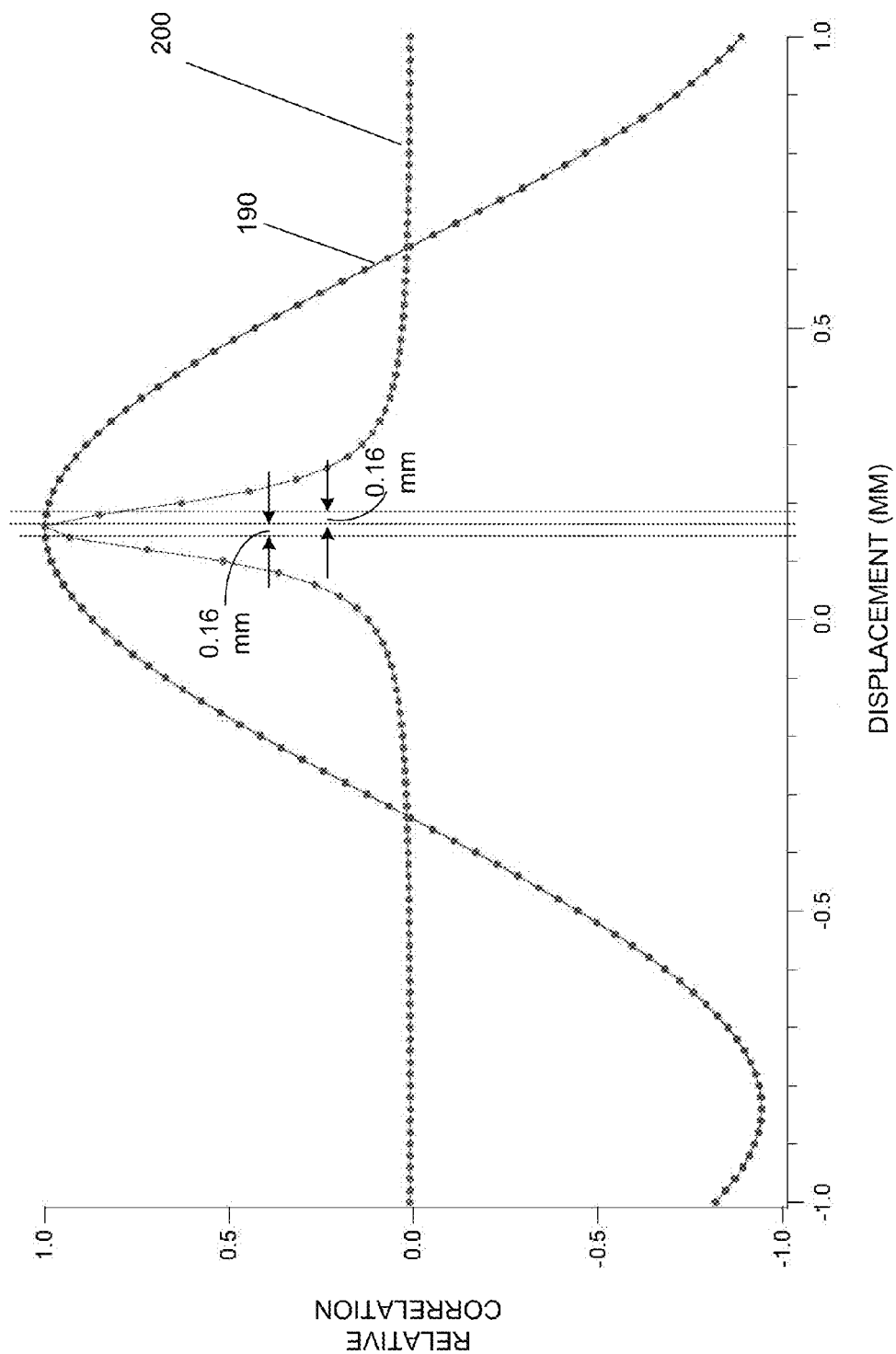
FIG. 12 is a graph showing the results of a traditional cross-correlation and an ISSD correlation of the two waveforms of FIG. 11.

FIG. 12 shows the results 190, 200 of the traditional cross-correlation and ISSD correlation, respectively. The data for the correlations here is taken at a relatively coarse 20 µm/data point resolution, resulting in about 1000 data points. The correlations are well behaved (i.e., no double peaks or other artifacts) and produce a solution with resolution at 0.16 mm (which is less than the maximum 0.25 mm displacement in FIG. 11), which represents the best-fit, averaged torsion over the measurement interval. Other magnetic encoding patterns can be employed, especially if the total displacement is expected to extend beyond the spatial wavelength of the underlying recording (in these examples, the spatial wavelength is ±1 mm, or 2 mm total). With large displacements, there can be ambiguity as to the proper phase of the correlation, which could be resolved with a more sophisticated encoding pattern. For the relatively small displacements shown in the example of FIG. 11, a simple magnetic pattern with 1 mm transition spacing is sufficient.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims. For example, although ISSD is described herein as a preferred correlation technique for finding the displacement between the ends of a rod, other correlation methods can be employed with departing from the principles of the invention.

What is claimed is:

1. A measurement system, comprising:
   a rotating member configured to transfer mechanical energy to a point of use, the member having at a surface thereof a pair of spatially separated, circumferentially oriented bands of magnetizable material, each band having a magnetic pattern comprised of a plurality of transitions magnetically recorded in the magnetizable material of that band, the transitions having approximately a 1 mm spacing;
   a magnetic-field sensor being disposed sufficiently near each band of magnetizable material to sense the magnetic pattern recorded in that band as the member rotates, each magnetic-field sensor generating signals in response to the magnetic pattern sensed by that magnetic-field sensor; and
   processing electronics in communication with each magnetic-field sensor to receive the signals generated by that magnetic-field sensor while the member rotates and to dynamically compute, in response to the signals generated by the magnetic-field sensors sensing the magnetic patterns recorded in the spatially separated bands, an angular displacement of one of the spatially separated bands relative to the other of the spatially separated bands,
   wherein a resolution for computing the angular displacement is at a sub-micron level.

2. A measurement system, comprising:
   a shaft rotating about an axis, the shaft having a surface and a pair of spatially separated circumferentially oriented bands of magnetizable material directly on the surface of the shaft, each band having a magnetic pattern comprised of a plurality of transitions magnetically recorded in the magnetizable material of that band;
   a magnetic-field sensor being disposed sufficiently near each band of magnetizable material to sense the magnetic pattern recorded in that band as the shaft rotates, each magnetic-field sensor generating signals in response to the magnetic pattern sensed by that magnetic-field sensor; and
   processing electronics in communication with each magnetic-field sensor to receive the signals generated by that magnetic-field sensor while the shaft rotates, the processing electronics measuring, in response to the signals generated by the magnetic-field sensors, an angular displacement of one of the spatially separated bands relative to the other of the spatially separated bands, and computing torsion experienced by the shaft from the measured angular displacement.

3. The measurement system of claim 2, wherein the processing electronics dynamically computes, while the shaft rotates, a torque measurement in response to the measured angular displacement and other parameters associated with the rotating shaft.

4. The measurement system of claim 2, wherein the processing electronics computes multiple torque measurements during each complete revolution of the shaft.

5. The measurement system of claim 2, wherein the processing electronics measures the angular displacement between the spatially separated bands by computing an inverse sum of the square of difference between the different signals generated by sensing the spatially separated bands.

6. The measurement system of claim 2, further comprising a calibration system determining an initial relative displacement between the spatially separated bands with a predetermined torque applied to the shaft.

7. The measurement system of claim 6, wherein the predetermined torque is zero load.

8. The measurement system of claim 2, wherein the transitions have approximately a 1 mm spacing, and wherein a resolution for computing the angular displacement is at a sub-micron level.

9. The measurement system of claim 2, wherein the magnetizable material of each band is a magnetically hard layer integrally formed at the surface of the shaft.

10. The measurement system of claim 2, wherein the magnetizable material of each band comprises a magnetizable alloy strip attached to the surface of the shaft.

11. The measurement system of claim 2, wherein the processing electronics measures a rotational speed of the rotating shaft from signals produced by sensing the magnetic pattern of one band of the one or more bands and, in response to the rotational speed, computes frequency and phase information of any vibration being impressed upon the rotating shaft.

12. A measurement system, comprising:
a shaft rotating about an axis, the shaft having at a surface thereof a circumferentially oriented band of magnetizable material, the band having a magnetic pattern comprised of a plurality of transitions magnetically recorded in the magnetizable material;
a magnetic-field sensor being disposed sufficiently near the band of magnetizable material to sense the magnetic pattern as the shaft rotates, the magnetic-field sensor generating signals in response to the magnetic pattern; and
processing electronics in communication with the magnetic-field sensor to receive the signals generated by the magnetic-field sensor while the shaft rotates, the processing electronics measuring vibration occurring in the rotating shaft from the received signals generated by the magnetic-field sensor.

13. A method for measuring performance of a rotating member, comprising:
providing a pair of spatially separated bands of magnetizable material at a surface of a rotatable member, each of the one or more bands having a magnetic pattern comprised of a plurality of transitions with approximately a 1 mm spacing magnetically recorded in the magnetizable material of that band;
rotating the member to transfer mechanical energy to a point of use;
sensing the magnetic pattern recorded in each of the one or more bands of magnetizable material as the member rotates;
generating signals in response to each sensed magnetic pattern;
dynamically computing, in response to the generated signals, an angular displacement of one of the spatially separated bands relative to the other of the spatially separated bands at a sub-micron level resolution.

14. The method of claim 13, further comprising dynamically computing, while the member rotates, a torque measurement in response to the measured angular displacement and other parameters associated with the rotating member.

15. The method of claim 13, further comprising dynamically computing, while the member rotates, multiple torque measurements during each complete revolution of the member.

16. The method of claim 13, wherein measuring the angular displacement between the spatially separated bands includes computing an inverse sum of the square of difference between the signals generated from each of the bands.

17. The method of claim 13, further comprising calibrating an initial relative displacement between the spatially separated bands while a predetermined torque is being applied to the member.

18. The method of claim 17, wherein the predetermined torque is zero load.

19. The method of claim 13, wherein providing the one or more bands of magnetizable material at a surface of a rotatable member includes integrally forming a magnetically hard layer at the surface of the member and magnetically recording a magnetic pattern in each band in the magnetically hard layer.

20. The method of claim 13, wherein providing the one or more bands of magnetizable material at a surface of a rotatable member includes magnetically recording a magnetic pattern into one or more alloy strips and attaching each magnetizable alloy strip to the surface of the member.

21. The method of claim 13, further comprising computing frequency and phase information of any vibration being impressed upon the rotating member from signals produced by sensing the magnetic pattern of one band of the one or more bands.

22. The measurement system of claim 12, wherein the band is a first band, and the shaft has, at the surface of the shaft, a second, circumferentially oriented band of magnetizable material spatially separated from the first band, and further comprising a second magnetic-field sensor being disposed sufficiently near the second band of magnetizable material to sense the magnetic pattern as the shaft rotates, and
wherein the processing electronics measures, in response to the signals generated by the magnetic-field sensors sensing the magnetic patterns recorded in the spatially separated bands, an angular displacement of one of the spatially separated bands relative to the other of the spatially separated bands.

23. The measurement system of claim 22, wherein the processing electronics dynamically computes, while the shaft rotates, a torque measurement in response to the measured angular displacement and other parameters associated with the rotating shaft.

24. The measurement system of claim 22, wherein the processing electronics computes multiple torque measurements during each complete revolution of the shaft.

25. The measurement system of claim 22, wherein the processing electronics measures the angular displacement between the spatially separated bands by computing an inverse sum of the square of difference between the different signals generated by sensing the spatially separated bands.

26. The measurement system of claim 22, further comprising a calibration system determining an initial relative displacement between the spatially separated bands with a predetermined torque applied to the shaft.

27. The measurement system of claim 26, wherein the predetermined torque is zero load.

28. The measurement system of claim 22, wherein the transitions have approximately a 1 mm spacing, and wherein a resolution for computing the angular displacement is at a sub-micron level.

29. The measurement system of claim 12, wherein the magnetizable material of the band is a magnetically hard layer integrally formed at the surface of the shaft.

30. The measurement system of claim 12, wherein the magnetizable material of the band comprises a magnetizable alloy strip attached to the surface of the shaft.

31. The measurement system of claim 12, wherein the processing electronics measures a rotational speed of the rotating shaft from signals produced by sensing the magnetic pattern of the band and, in response to the rotational speed, computes frequency and phase information of the vibration in the rotating shaft.

* * * * *